INVENTOR.
OLLIE W. GRAHAM
BY Arthur L Wade
ATTORNEY

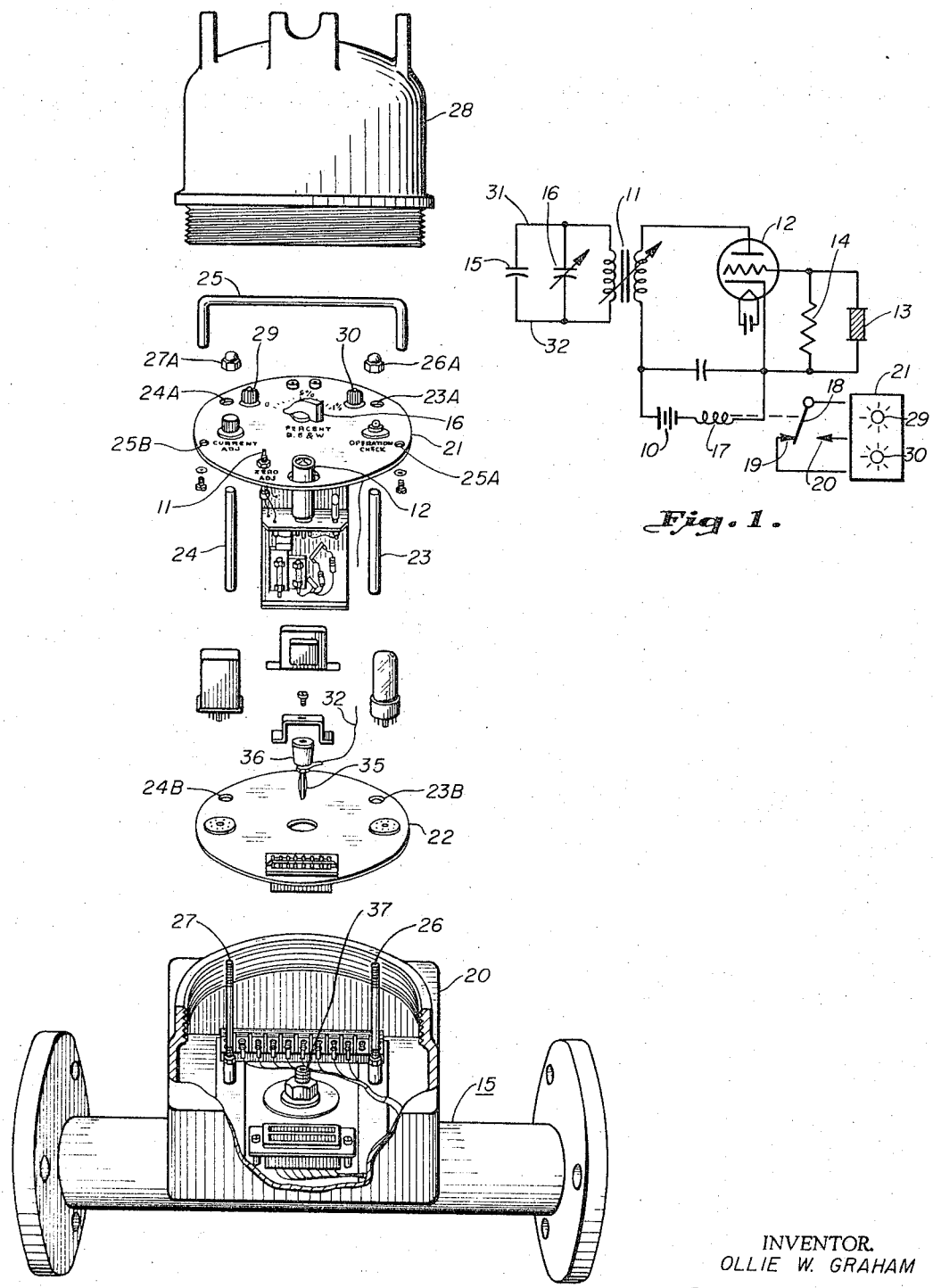

United States Patent Office 3,368,147
Patented Feb. 6, 1968

3,368,147
BASIC SEDIMENT AND WATER MONITOR UTILIZING ONE PLATE OF A CONDENSER FOR MOUNTING A HOUSING FOR COMPONENTS OF A CAPACITANCE MEASURING CIRCUIT
Ollie W. Graham, Tulsa, Okla., assignor, by mesne assignments, to Combustion Engineering, Inc., a corporation of Delaware
Continuation of application Ser. No. 174,768, Feb. 21, 1962. This application Jan. 17, 1966, Ser. No. 532,030
2 Claims. (Cl. 324—61)

This application is a continuation of my application Ser. No. 174,768, filed Feb. 21, 1962.

The present invention relates to instruments for the measure of basic sediment and water in oil well production. More particularly, the invention relates to a physical arrangement for the components of the instrument and the electrical connection between the primary element and the components of the circuit, which circuit is responsive to the output signal of the primary element.

For many years now, the most acceptable instruments commercialized in the oil field to detect and manifest BS & W in oil well production have employed a circuit disclosed in at least United States Patent Gunst et al. 2,720,624 which issued Oct. 11, 1955. The assignee of this patent has licensed many manufacturers to commercialize various embodiments of the invention covered by the patent. Therefore, the basic circuit disclosed in this patent is well known and generally accepted as suitable to indicate the percent of BS & W in oil well production.

The primary element of the Gunst circuit is a condenser. This condenser is commonly referred to as the probe, comprising two plates between which the oil well production is flowed. The dielectric constant of particular fluids produced remain reasonably stable. However, when the BS & W content varies in the production, the capacitance of the probe and fluid flowing through it changes. The Gunst circuit responds to this capacitance as an output and manifests the percentage of BS & W in the production.

The probe of the BS & W monitor is conventionally attached to the circuit of the monitor by coaxial cable. Basically, it is well known that the connecting cable is subject to varying conditions which will change the capacitance between the two conductors of the cable. As the capacitance between the conductors, as far as the monitor circuit is concerned, is a part of the capacitance of the combination of the probe and cable, the varying conditions not related to BS & W in the fluids results in an error in the value manifested.

At least the variable conditions of the temperature, moisture, mechanical stress and induced electrical effects are to be considered with respect to the cable. The manifesting circuit "looks" at these variables and includes them in the manifestation it produces, making the manifestation correspondingly erratic and erroneous. Installations often become critical, and much subjective know-how has been developed to insure that the manifestation will truly represent the variations of the BS & W in the production flowing through the probe. Theoretically, this problem would be eliminated if the cable between the probe and monitor were eliminated. Taking this theoretical aspect of the problem into account, the present invention was conceived and successfully reduced to practice.

The principal object of the present invention is to reduce the effect of variables such as temperature, moisture, mechanical stress and induced electrical effects in the signal received by a circuit manifesting BS & W in oil well production.

Another object of the invention is to make a compact arrangement of the components of a circuit manifesting BS & W in oil well production, including the reduction in physical size of the electrical connection between the primary element and the circuit.

Another object of the invention is to arrange the components of the circuit so they may be readily replaced and serviced.

The present invention contemplates a condenser arranged with production fluids of an oil well flowing between the plates of the condenser. One plate of the condenser is given a form on which may be mounted a housing for components of a circuit electrically connected to the condenser plates with a connection short enough to militate against changes in temperature, moisture, mechanical stress and induced electrical effects influencing the value of capacitance to which the components of the housing respond.

The invention further contemplates that the components of the manifesting circuit in the housing be arranged in a compact package which can be manually disconnected from the condenser without the use of special tools.

Other objects, advantages and features of this invention will become apparent to one skilled in the art upon consideration of the written specification, appended claims, and attached drawings, wherein;

FIG. 1 is a circuit diagram of the instrument in which the present invention is embodied;

FIG. 2 is an exploded isometric view of the physical components in which the invention is included.

*General organization*

Figure 3:
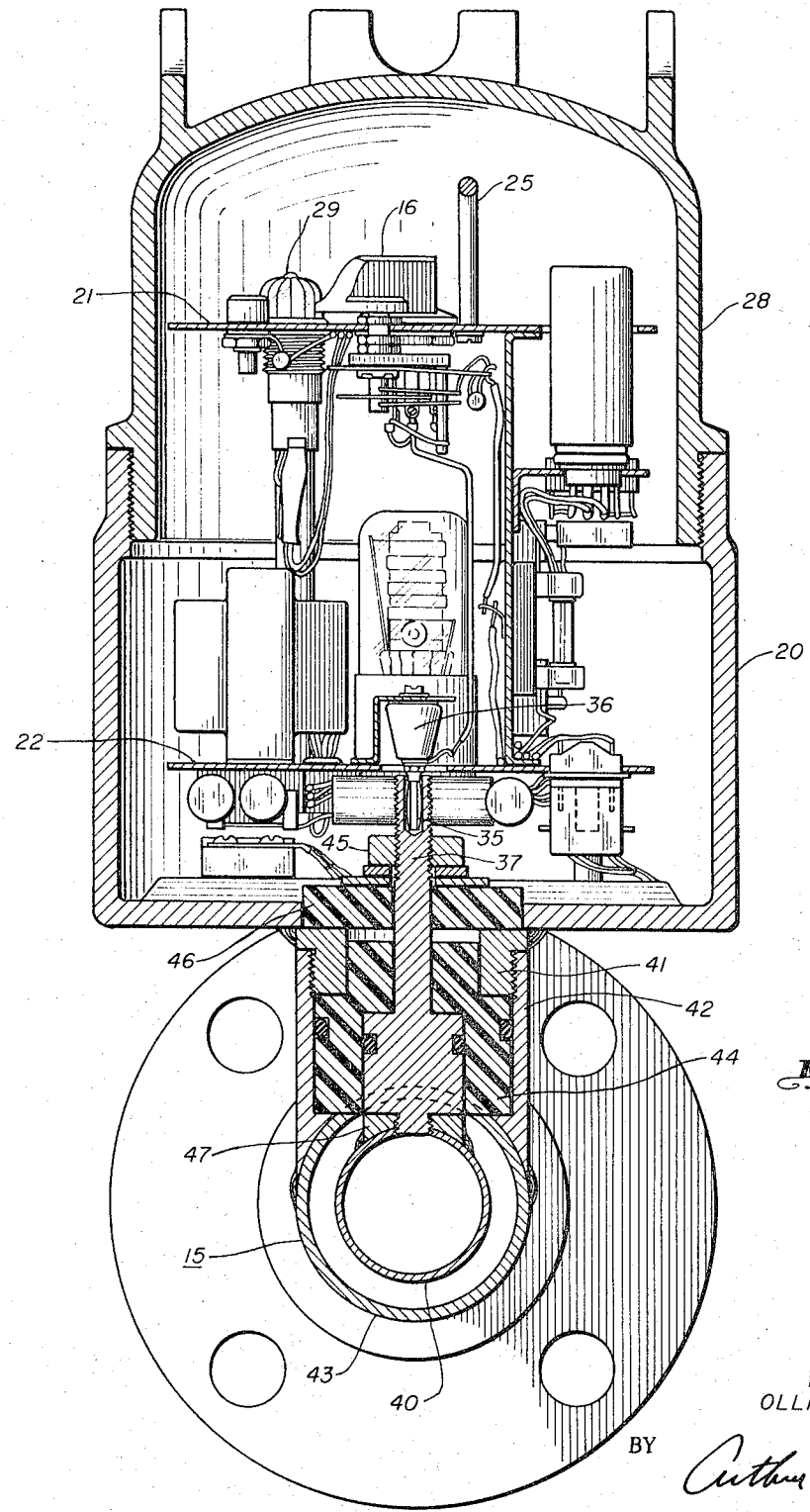
FIG. 3 is a sectioned end elevation of the apparatus of FIG. 2 when all parts are in operative position.

FIG. 1 is established to show the general type of circuit commonly associated with the invention. FIG. 2 is established to show the general mechanical relation of circuit components associated with the invention. Where suitable, common reference numerals are used in these two figures.

FIG. 1 depicts, in a general sense, the circuit disclosed in at least United States Patent Gunst et al. 2,720,624 which issued Oct. 11, 1955. This is a crystal-controlled vacuum tube circuit. Specifically, a power supply 10 energizes the circuit which includes an adjustable transformer 11; oscillating type tube 12; a crystal 13 in the grid circuit of the tube; and a grid resistor 14 having very high resistance. The input to this circuit comes through transformer 11. In this input circuit coupled to transformer 11 is a capacitance 15, called a probe, and an adjustable capacitance 16.

The complete circuit is tonable, oscillating at a frequency controlled by the natural frequency of crystal 13. Ordinarily crystal 13 is of quartz, although other types of crystals can be used. The grid resistor 14 is very high in value, making it possible to extend the oscillating range of the circuit to very low values of plate tuning capacitance, or to corresponding high values of inductance. It is well known that a large decrease or increase in plate DC current occurs when the circuit goes into, or out of, oscillation, due to an increase or decrease of capacitance as compared to inductance.

A relay coil 17 is connected in series with power source 10. The relay armature is indicated at 18 and its associated contacts 19 and 20, and these may lead to an exhibiting device, which may, for example, be an indicator, alarm, recorder, or controller as desired. Such responsive device is represented at 21.

The dielectric constant of water is usually about thirty times as great as that of oil, and the presence of bottom sediment and water results in large changes in the dielectric constant of a mixture of oil and BS & W. Variations in dielectric constant of such mixtures are large and proportional to the quantity of BS & W present. This factor furnishes an excellent means for measuring quantities of BS & W in the mixture.

In general, mixtures of oil and BS & W are passed between the plates of probe 15. When the probe capacitance is sufficiently high to cause the oscillating circuit to snap out of oscillation, the DC plate current is maintained at the high value and current flows through relay coil 17. Armature 18 is then actuated to contact 19 or 20. Device 21 is, in turn, actuated to indicate the high probe capacitance.

If the probe capacitance is below a standard or reference value, the oscillating circuit will remain in oscillation, due to the high resistance of grid resistor 14 and the presence of crystal 13 in the grid circuit. The DC plate current will then be low, and the relay coil will maintain 18 in contact with 19 or 20. Device 21 then indicates the opposite low value of capacitance at probe 15. Adjustable capacitance 16 can be set to an expected standard, or reference, probe capacitance. When deviations from this reference capacitance occurs, device 21 establishes a corresponding signal.

In external appearance, probe 15 is a flanged conduit fabricated to be included in a line through which is passed a mixture of oil and BS & W. Subsequently, FIG. 3 will show this probe in its various parts. A housing 20 is mounted directly on the external surface of the probe 15 casing, the housing 20 sized to contain all the components of the FIG. 1 circuit. Within this arrangement, completion of a direct and extremely short electrical connection is made possible between the plates of probe 15 and the remainder of the circuit. This connection solves the problems of varying ambient temperature, moisture, mechanical stress and induced electrical effects on the manifestation of the circuit. Utilizing this connection, the circuit does not respond to such variables as are extraneous to the BS & W content of the liquids sensed. Correspondingly, the manifestation of the circuit is a stable and consistent guide to the BS & W content of fluid mixtures passed through probe 15.

The components of FIG. 2 are shown "exploded" to aid comprehension of how these components fit together to form the extremely compact unit embodying the invention. Between, and on, chassis top plate 21 and chassis bottom plate 22, all of the circuit components are mounted with the exception of probe 15.

The top and bottom plates are held in spacial relationship by spacers 23 and 24. These tubular spacers 23 and 24 extend through holes 23A, 23B and 24A, 24B and are crimped on the opposite side of their holes to fix the top and bottom plates parallel to each other and a specified distance apart.

Handle 25 is mounted to top plate 22 through holes 25A and 25B. With handle 25, the chassis is positioned down into housing 20, the support studs 26 and 27 sliding up through hollow spacers 23 and 24. Nuts 26A and 27A are then threaded to the ends of studs 26 and 27 to mount the chassis firmly within housing 20.

Once the chassis is mounted in position within housing 20 cap 28 is lowered into position and threaded to the housing. All, or a portion of cap 28 may be transparent to permit observation of indicating lights 29 and 30.

Within this general organization is the prominent feature of the unique coupling between the probe and the circuit. Referring again to FIG. 1, leads 31 and 32 include probe 15 in the FIG. 1 circuit. Commonly, these leads are embodied in a coaxial cable of some length. In the present organization, under the teachings of the present invention, such coaxial cable has been eliminated and an extremely short, direct connection substituted. Specifically, lead 32 is brought from the circuit to one plate of the probe. The housing 20 is actually the other lead.

Much of the wiring has been deleted from FIG. 2 to provide a simple drawing. However, a male plug 35 is illustrated as having electrical connection with the circuit by means of lead 32. Obviously, it makes no electrical difference whether plug 35 is regarded as a part of lead 31 or lead 32. The second lead is through the chassis itself, to the outside plate of probe 15 which is given the form of a flanged conduit. Plug 35, as a male connection, is mounted on insulator 36 at a position where it can electrically engage spacer stud 37 when the chassis is mounted within housing 20. It is the direct electrical coupling of plug 35 with spacer stud 37 that completes the unique electrical connection between probe 15 and the FIG. 1 circuit.

FIG. 3 is a detailed disclosure of the structure of FIG. 2, brought together within housing 20 with cap 28 in place. Most importantly, male plug 35 is clearly shown in place, within its axial hole in the end of spacer stud 37. Thus the electrical connection between probe plate 40 and the circuit is completed with the shortest practical path. Further, the connection is surrounded by insulators, housing 20 and circuit components to isolate it from the variable which create the problem solved.

The housing 20 is actually welded to a nut 41 which threads down into a saddle 42, in turn welded directly to the outer conduit-capacitor plate 43 of probe 15. Saddle 42 then becomes a housing for the insulation-seal about spacer stud 37. Specifically, bushing 44 is turned to a size which will fit down into saddle 42 and seal to the walls of the saddle with an O-ring.

Spacer stud 37 is threaded on each end. The upper end is threaded to receive nut 45 to capture washer 46. The lower end is threaded to attach the stud to bushing 47 which is welded on probe plate 40. The bushing 44 and washer 46 may be of good insulating material, such as nylon, which can also be effectively sealed to the walls of saddle 42, and about stud 37, to retain the fluids of plate-conduit 43.

Once in place, the unit functions as a complete, self-contained instrument for detecting the BS & W content of oil passed through probe 15. The unit is, as a matter of fact, compact and internally arranged to prevent extraneous variables from effecting its manifestation.

From the foregoing it will be seen that this invention is one well adapted to attain all of the ends and objects hereinabove set forth, together with other advantages which are obvious and which are inherent to the apparatus.

It will be understood that certain features and sub-combinations are of utility and may be employed without reference to other features and sub-combinations. This is contemplated by and is within the scope of the claims.

As many possible embodiments may be made of the invention without departing from the scope thereof, it is to be understood that all matters herein set forth or shown in the accompanying drawings is to be interpreted as illustrative and not in a limiting sense.

The present invention having been described, what is claimed is:

1. A monitor for the basic sediment and water content of oil well production including:
    a capacitance probe arranged to directly contact oil well production and including,
        a conduit fabricated to be included in a line through which is passed a mixture of the oil and basic sediment and water of an oil well production while functioning as one plate of the probe,
        and a second plate of the probe mounted within the conduit in a position that the mixture of oil and basic sediment and water passes between the plates as an electrical condenser;
    a housing mounted on the external surface of the conduit of the probe;
    a female connection mechanically mounted to extend through the walls of the housing and conduit of the probe to make an electrical connection with the second plate of the probe;

a chassis which is manually movable and positionable;

components of a circuit responsive to the changes in capacitance output of the probe mounted on the chassis as a unit;

and a male connection mounted on the chassis at a position to electrically engage the female connection when the chassis is manually positioned into the housing and thereby complete the electrical connection between the circuit components on the chassis and the probe with an electrical connection of such short length that the capacity of the probe and connection will not vary more than a predetermined amount.

2. A monitor for the basic sediment and water content of oil well production including:

a capacitance probe arranged to directly contact oil well production and including,
 a conduit fabricated to be included in a line through which is passed a mixture of the oil and basic sediment and water of an oil well production while functioning as one plate of the probe,
 and a second plate of the probe mounted within the conduit in a position that the mixture of oil and basic sediment and water passes between the plates as an electrical condenser;

a housing mounted on the external surface of the conduit of the probe;

the first half of a male-female connection mechanically mounted to extend through the walls of the housing and conduit of the probe to make an electrical connection with the second plate of the probe;

a chassis which is manually movable and positionable;

components of a circuit responsive to the changes in capacitance output of the probe mounted on the chassis as a unit;

and the second half of a male-female connection mounted on the chassis at a position to electrically engage the first half of the connection when the chassis is manually positioned into the housing and thereby complete the electrical connection between the circuit components on the chassis and the probe with an electrical connection of such short length that the capacity of the probe and connection will not vary more than a predetermined amount.

References Cited

UNITED STATES PATENTS

| | | | |
|---|---|---|---|
| 2,599,583 | 6/1952 | Robinson et al. | 324—61 |
| 2,736,807 | 2/1956 | Porter | 324—149 X |
| 2,976,720 | 3/1961 | Callahan | 73—61 |
| 3,068,403 | 12/1962 | Robinson | 324—72.5 X |
| 3,123,751 | 3/1964 | Balsbaugh | 317—246 |
| 3,148,314 | 9/1964 | Ponemon | 317—246 |
| 3,215,900 | 11/1965 | Harvey | 317—246 |

RUDOLPH V. ROLINEC, *Primary Examiner.*

FREDERICK M. STRADER, WALTER L. CARLSON, *Examiners.*

E. E. KUBASIEWICZ, *Assistant Examiner.*